United States Patent [19]
Juliano

[11] 3,787,238
[45] Jan. 22, 1974

[54] FLUORESCENT SCREENS
[75] Inventor: Peter C. Juliano, Scotia, N.Y.
[73] Assignee: General Electric Company, Schenectady, N.Y.
[22] Filed: Dec. 10, 1971
[21] Appl. No.: 206,609

[52] U.S. Cl. ......... 117/335 R, 117/69, 117/132 BS, 117/161 ZA, 250/80, 252/301.3, 313/92, 260/827
[51] Int. Cl. ....... H01j 1/54, C08g 47/10, C09k 1/00
[58] Field of Search... 117/33.5 R, 132 BS, 161 ZA, 117/69; 250/80; 252/301.3; 315/92; 260/827, 33.8 SB, 46.5 R

[56]  References Cited
UNITED STATES PATENTS

| | | | |
|---|---|---|---|
| 2,907,882 | 10/1959 | Patten | 117/33.5 R |
| 3,663,650 | 5/1972 | Juliano | 260/33.8 SB |
| 3,502,589 | 3/1970 | Newing | 117/33.5 R |
| 3,043,710 | 7/1962 | Patten et al. | 250/80 |
| 3,164,719 | 1/1965 | Bauer | 25/80 |
| 2,904,689 | 9/1959 | Masi et al. | 117/33.5 R |
| 2,820,146 | 1/1958 | Kunes | 250/80 |
| 2,950,222 | 8/1960 | Hinson | 250/80 |
| 3,005,103 | 10/1961 | Hinson | 250/80 |
| T903,008 | 10/1972 | McCabe | 117/161 KP |
| T904,018 | 11/1972 | Kroon et al. | 250/80 |

*Primary Examiner*—William D. Martin
*Assistant Examiner*—William R. Trenor
*Attorney, Agent, or Firm*—Gerhard K. Adam, Joseph T. Cohen and Jerome C. Squillaro

[57]  ABSTRACT

A fluorescent screen for use as an image intensifying screen is provided having a support, a light reflecting layer, a layer of fluorescent particles and an outer protective coating. The protective coating is a polymeric material having incorporated therein an effective amount of a transparent binary polydimethylsiloxane-polyalkylmethacrylate block copolymer.

8 Claims, 3 Drawing Figures

1 INTENSIFIER SCREEN
5 PROTECTIVE COATING
4 PHOSPHOR LAYER
3 REFLECTIVE LAYER
2 SUPPORT

FLUORESCENT SCREENS

This invention relates to fluorescent screens for use in radiography and more particularly it relates to protective coatings for X-ray intensifying screens.

As has been discussed by Johnson et al., U.S. Pat. No. 2,248,630, fluorescent screens or X-ray image intensifying screens are efficient in converting X-ray energy into electro-magnetic radiation within the visible and ultraviolet range. They are usually mounted in pairs in a rigid holder, called a "cassette," so that the fluorescent surface of each is in contact with one of the emulsion surfaces of the film. Usually the fluorescent screens have transparent protective coatings such as disclosed by Patten, U.S. Pat. No. 2,907,882. These coatings reduce the abrasion of the active surface and facilitates the removal of dirt and smudge from the screen. Various compositions were used heretofore in forming the protective coatings such as cellulose derivatives and homopolymers, and complex mixtures of vinyl chloride/vinyl acetate copolymer, poly(methylmethacrylate) and poly(isobutylmethacrylate). Ideally, the protective coating should have good abrasion resistance so that the encapsulated phosphor is protected and not easily exposed, hydrophobicity so that water can not permeate into the phosphor layer and react to cause a decreased efficiency, and a low coefficient of friction to minimize the build-up of static charge on the surface during normal use which is capable of damaging the light sensitive film. Unfortunately, the frequency with which the screens have to be replaced indicate that the protective coatings used heretofore fail in one or more of the requirements.

In accordance with the present invention, I have discovered an improved fluorescent screen comprising a support, a layer of fluorescent particles on said support and an outer protective coating comprised of a hydrophobic, hard film forming polymer having incorporated therein an effective amount of a transparent block copolymer of a polydimethylsilicone and a poly(alkylmethacrylate). Usually a light reflecting layer is placed between the support and the fluorescent layer. The novel protective coating is permanent, has good abrasion resistance, is hydrophobic and reduces build-up of static charge.

The invention is more clearly understood from the following description taken in conjunction with the accompanying drawing in which.

Figure 1:
FIG. 1 is a cross sectional view of a fluorescent screen of an embodiment of the present invention.

Referring now to FIG. 1, the image intensifying screen 1 is composed of a support 2 as employed in conventional fluorescent screens onto which is usually placed a reflective layer 3. Thereafter a phosphor layer 4 of X-ray fluorescent particles embedded in a film-forming binder is coated on top of the reflective layer 3. The protective coating 5 which is formed from a hard film forming polymer is then applied to the phosphor layer 4.

The support 2 is generally composed of paper, metal foil, or plastic sheet. Preferably the support is a hydrophobic polymer which includes cellulose derivatives, e.g., cellulose acetate, cellulose acetate butyrate; polyesters, e.g., polyethylene terephthalate; and vinyl polymers, e.g., polyvinyl chloride, polyvinyl acetate, polystyrene, and polyethylene. The thickness of the support may be in the range of about 0.25–30 mils.

The reflective layer 3 generally contains a pigment, e.g., magnesium oxide which is embedded in a binder, such as polyvinyl butyral. Typically, the reflective layer 3 has a thickness of about 0.3–1 mils or more.

The fluorescent layer 4 contains fluorescent materials which have been used in conventional fluorescent intensifying screens. The layer contains a fluorescent material, such as calcium tungstate, barium sulfate activated with lead, zinc sulfide activated with silver, potassium iodide activated with thallium, etc., together with a binder, such as an organic polymer, e.g., cellulose acetate, polyvinyl acetate, polystyrene, polymethylmethacrylate, polyvinyl butyral, etc.

The surface of the fluorescent layer 4 is protected against moisture and abrasion by applying to it a protective coating 5 of a compatible transparent polymeric composition. The protective coating is a mixture of a polymeric material which includes: clear polyalkylmethacrylate plastics wherein the alkyl group contains from one to four carbon atoms, e.g., polymethylmethacrylate, polyethylmethacrylate, polypropylmethacrylate and polyisobutylmethacrylate; methylmethacrylate copolymers with other alkylmethacrylates wherein the glass transition temperature (Tg) is in the range of 30°–100°C.; cellulose compounds such as cellulose acetate, cellulose propionate, cellulose acetate propionate, cellulose acetate butyrate, nitrocelluloses; and polyvinylchloride and vinylchloride vinylacetate copolymers.

The binary polydimethylsiloxane-polyalkylmethacrylate block copolymers useful in the present invention and the method of making them are disclosed in my copending application Ser. No. 102,086 filed on Dec. 28, 1970, now U.S. Pat. No. 3,663,650 and assigned to the assignee of the present application. Accordingly, the binary block copolymer of polydimethylsiloxane-polyalkylmethacrylates are prepared by anionically polymerizing of a cyclopolydimethylsiloxane with a dilithio aromatic initiator, reacting between the resulting lithium terminated polydimethyl siloxane and an alkylmethacrylate, and recovering the polydimethylsiloxane-polyalkylmethacrylate block copolymer from the resulting mixture.

The cyclopolydimethylsiloxanes which can be used in the present invention include hexamethylcyclotrisiloxane, octamethylcyclotetrasiloxane, etc. These cyclic siloxanes can be made by hydrolyzing dimethylchlorosilane and separating the resulting cyclic polydimethylsiloxane from the mixture. Some of the alkylmethacrylates which can be employed to produce the polydimethylsiloxane-polyalkylmethacrylate block copolymers are, for example, methylmethacrylate, ethylmethacrylate, butylmethacrylate, etc. The block copolymer can comprise from about 5–90 percent by weight of polydimethylsiloxane blocks and correspondingly from about 10–95 percent by weight of polyalkylmethacrylate blocks. The polydimethylsiloxane blocks may contain from about 3–1,500 chemically combined dimethylsiloxane units and preferably from about 3–500 units. In addition the polyalkylmethacrylate blocks can have from 1–10,000 chemically combined alkylmethacrylate units and preferably from about 500–1,500 units.

An effective amount of the block copolymer is incorporated into the polymeric plastic material to form the protective coating. The amount of block copolymer incorporated to form the protective coating will vary to some extent with the plastic polymeric material being modified as, for example illustrated by the curves in FIG. 2 and FIG. 3. Thus, for the system using methylmethacrylate an effective amount can be as low as 0.001 percent by weight of the plastic polymer material, while for the system using cellulose acetate-butyrate the minimum amount is about 0.5 percent by weight. The maximum amount of block copolymer added should not, however, exceed about 5 percent by weight of the coating composition since greater amounts are unnecessary.

The protective coating is applied to the surface of the X-ray image intensifying screen from a coating solution for the polymeric plastic material together with the additive in a suitable solvent. These solvents include aromatic solvents, e.g., benzene, toluene and xylene; alcohols, e.g., cyclohexanol; ketones, e.g., acetone, methylethylketone and methylisobutylketone; and esters, e.g., ethyl acetate and butyl acetate. The concentration of polymer plus additive in the solution should be such that there is a sufficient solids content to give a workable viscosity and such that a bubble free film may readily be applied to the under surface. Usually the solution should have a solids content in the range of about 10–20 percent by weight.

My invention is further illustrated by the following examples:

EXAMPLE I

An opaque light-reflecting layer formulation was prepared by dissolving 100 parts of a low molecular weight poly(methylmethacrylate), $\eta_{inh} \approx 0.2$ in $CHCl_3$, 100 parts of a high molecular weight poly(methylmethacrylate), $\eta_{inh} \approx 1.2$ in $CHCl_3$, 19.8 parts of a poly(vinylidene chloride) in 620 parts of toluene, 53.5 parts of n-butyl acetate and 116 parts of a 1:1(v/v) mixture of ethanol and cyclohexane. The pigment, $TiO_2$, 540 parts, was added and the mixture was roll milled for 24 hours. The suspension was filtered to remove any large $TiO_2$ agglomeratives, rolled to remove air bubbles, then cast onto a 10 mil transparent polyethylene terephthalate film to provide a dry film thickness of 1 mil.

Onto this opaque light reflecting layer was cast a solution containing the phosphor in a suitable binder/solvent system, such as a plasticized nitrocellulose dissolved in n-butyl acetate. This phosphor layer was cast to provide a dry film having a thickness of about 4 mils.

A protective coating layer, which was substantially identical to the binder/solvent system for the light reflecting layer (without the addition of the block copolymer) was cast directly onto the phosphor containing layer. This protective coating layer has a dry film thickness of approximately 0.5 mil. To another identical formulation of binder and solvent was added 0.8 part of a polydimethylsiloxane-polyalkylmethacrylate block copolymer (as described in Example III). This solution was coated onto the surface of the phosphor containing layer of a second screen prepared identically to the first screen.

The presence of the block copolymer reduced the surface tension of the casting solution, thus allowing any small bubbles produced in the casting procedure to burst and flatten. Screens with and without the block copolymer were examined by placing a small, $\approx 5 \mu l$, water drop on the surface. The water contact angle was about 90° for the screen containing the block copolymer in the topcoat and about 46° for the screen without the block copolymer. The screen containing the block copolymer was washed several times with hexane and ethanol. Again the water contact angle was measured and found to be 90°. Neither the hardness of the protective topcoat layer, nor the adhesion of the topcoat protective layer to the phosphor layer were affected by the presence of the block copolymer.

EXAMPLE II

An opaque light reflecting layer was prepared by dissolving 100 parts cellulose acetate butyrate in 800 parts of a mixture of ethyl acetate and cellosolve acetate (9:1 v/v) and by adding to this solution 200 parts of $TiO_2$. This mixture was roll milled, filtered, rolled and cast onto a poly(ethylene terephthalate) film in the manner described in Example I.

A phosphor containing layer was prepared using, as a binder, a vinyl acetate-vinyl chloride copolymer dissolved in butyl acetate. The phosphor was dispersed in this solution and applied to the light reflecting layer to produce a phosphor layer with a dry film thickness of about 4 mils.

A protective topcoat layer was applied onto the phosphor layer. This topcoat formulation was substantially identical to the binder/solvent system used in the light reflecting layer in this example. To an identical formulation was added 0.5 percent by weight (based on the cellulose acetate butyrate) of a polydimethylsiloxane-polyalkyl-methacrylate block copolymer (as described in Example III). Both topcoat formulations were cast onto the phosphor layers of two identical screens to provide dry film thicknesses of about 0.5 mil. The screen containing the block copolymer exhibited a silicone surface upon examination by the water or ethylene glycol contact angle method. The effective limits for the block polymer in this topcoat formulation as well as the acrylic based topcoat are defined in Examples IV and V by simply examining topcoat formulations and the water or ethylene glycol contact angles on the surface of the dry films.

EXAMPLE III

A substantially transparent polydimethylsiloxane-polymethylmethacrylate block copolymer containing about 34.1 percent by weight of dimethylsiloxy units was prepared using the following procedure.

A dilithio initiator was made by stirring for 48 hours at 25°C. a mixture of 0.01 mole of benzophenone, 0.05 gram atoms of lithium metal in about 0.5 mole of tetrahydrofuran in a nitrogen atmosphere and under substantially anhydrous conditions.

After the solution was cooled to 0°C., there was added $5 \times 10^{-4}$ moles of the initiator to a solution of $4 \times 10^{-2}$ mole of hexamethylcyclotrisiloxane in 1.5 mole of anhydrous tetrahydrofuran. The mixture was stirred for 30–45 minutes and then there was added $1 \times 10^{-3}$ mole of hexamethylphosphortriamide to the mixture which was maintained at a temperature of 0°C. for a period of 8 hours. The intrinsic viscosity of the polydimethylsiloxane was found to be about 0.26 when measured in chloroform at 25°C., indicating the completion of the hexamethylcyclotrisiloxane polymerization. Then there was added, with stirring, about 0.1 mole of methylmethacrylate to the mixture over a 10 minute period. The polymerization of the methylmethacrylate was allowed to continue for 2.5 hours while the temperature was maintained at −40°C. The lithium ions were neutralized with a sufficient amount of acetic acid, the mixture allowed to warm to room temperature and the product precipitated in methanol.

The product was then extracted for 72 hours with hexane using a Soxhlet extraction apparatus. There was obtained about a 76.6 percent yield of a substantially transparent polydimethylsiloxane-polymethylmethacrylate block copolymer containing about 34.1 percent by weight of polydimethylsiloxane blocks.

EXAMPLE IV

Following the procedure of Example III, a transparent polydimethylsiloxane-polymethylmethacrylate block copolymer containing about 21.4 percent by weight of polydimethylsiloxane blocks. Various amounts of the block copolymer were incorporated into a cellulose acetate-butyrate polymer (Eastman 171-15). The amount of block copolymer incorporated and the characteristics of the film are shown in the table below:

TABLE I

| | Block Copolymer | Contact Angle (°) | |
|---|---|---|---|
| Exp. | wt. % | H$_2$O | Ethylene Glycol |
| A | 0 | 65.5 | 50 |
| B | 0.50 | 85 | 69 (90)* |
| C | 0.75 | 85 | 90 |
| D | 1.00 | 85 | 90 |

*After heating for 19 hours at 100° C.

Figure 2:
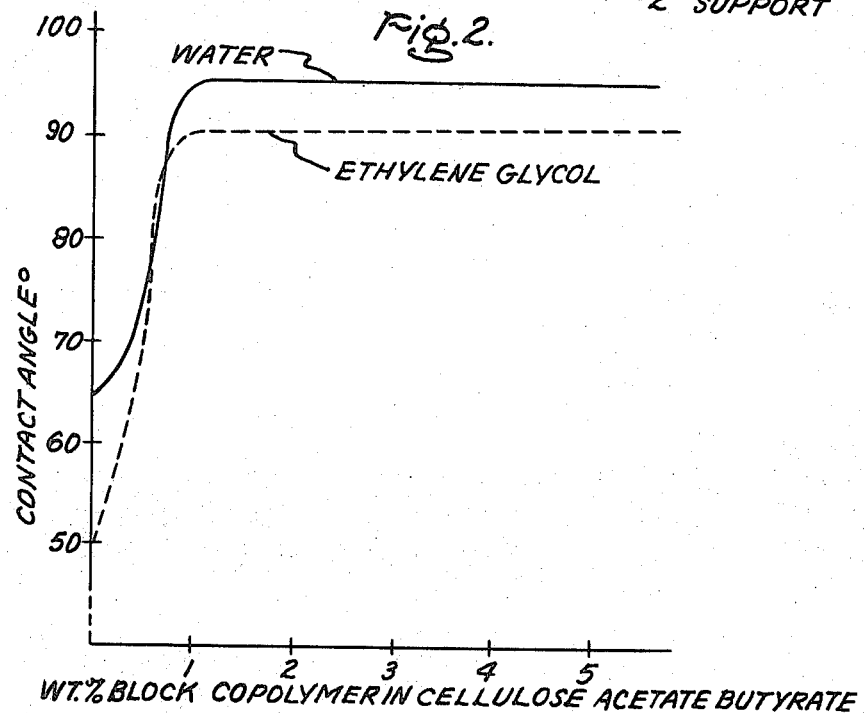
FIGS. 2 and 3 are graphic representation illustrating the effect of additions of the novel block copolymer to the protective layers as a function of their ability to produce nonwetting surfaces.

The above results, graphically shown in FIG. 2, indicate that 0.5 percent by weight of the silicone-methacrylate block copolymer provides a silicone surface which is hydrophobic, scuff resistant and abrasion resistant. In addition, these properties are enhanced by annealing the film below the glass transition temperature, Tg.

EXAMPLE V

Following the procedure of Example IV and using the polydimethylsiloxane-polymethylmethacrylate block copolymer containing about 21.4 percent by weight of polydimethylsiloxane blocks, various amounts of the block copolymer were incorporated into a polymethylmethacrylate polymer. The resultant compositions were cast as films on glass plates and dried overnight at 60° C. The amounts of block copolymer incorporated and the characteristics of the films are shown in the table below:

TABLE II

| | Block Copolymer | Contact Angle (°) | |
|---|---|---|---|
| Exp. | wt. % | H$_2$O | Ethylene Glycol |
| E | 0.0 | 60 | 50 |
| F | 0.001 | 75 | 63 |
| G | 0.01 | 87 | 76 |
| H | 0.05 | 95 | 89 |
| I | 0.1 | 91 | 90 |
| J | 0.5 | 97 | 90 |
| K | 1.0 | 97 | 90 |

Figure 3:
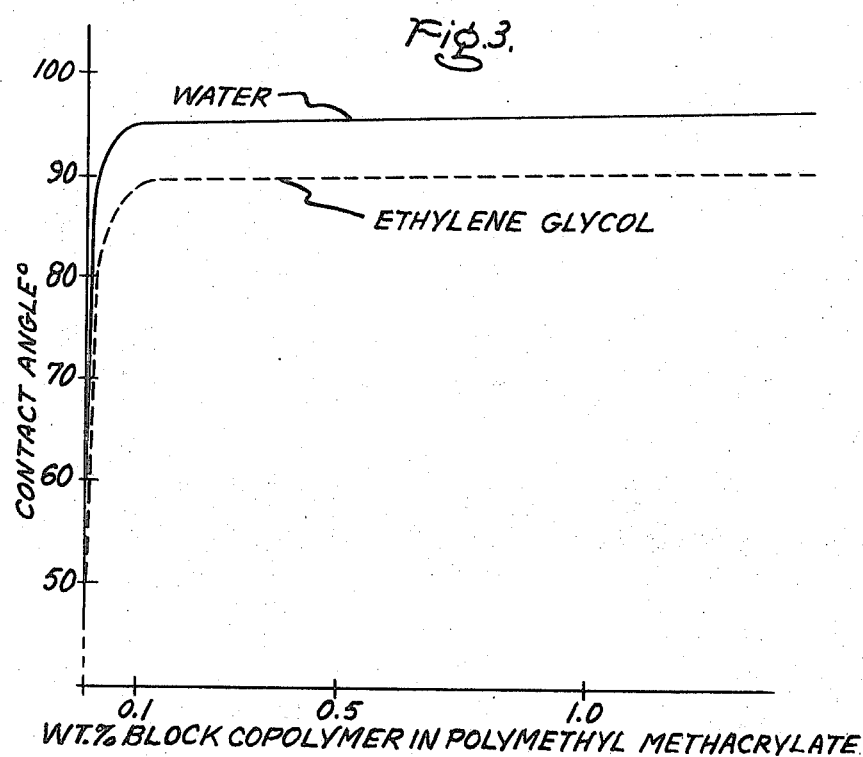

The results are tabulated and shown graphically in FIG. 3. These data indicate that the desirable properties, i.e., scuff resistance, hydrophobicity, etc., that are attributable to the silicone surface are observed when the level of the block copolymer present in the polymethyl-methacrylate system is 0.01 percent by weight.

It will be appreciated that the invention is not limited to the specific details shown in the examples and illustrations and that various modifications may be made within the ordinary skill in the art without departing from the spirit and scope of the invention.

I claim:

1. A fluorescent screen comprising a support and a layer of luminescent material bearing a protective layer comprising a transparent film forming polymer having incorporated therein an effective amount of a block copolymer of a polydimethylsilicone and a poly(alkylmethacrylate).

2. The screen of claim 1, having a light reflective layer between the support and the layer of luminescent material.

3. The screen of claim 2, wherein said film forming polymer is a member selected from the group consisting of a polyalkylmethacrylate wherein the alkyl group contains one to four carbon atoms, a methylmethacrylate copolymer with other alkylmethacrylates wherein the glass transition temperature is in the range of 30°–100°C., cellulose acetate, cellulose propionate, cellulose acetate propionate, cellulose acetate butyrate, nitrocellulose, polyvinylchloride and copolymers of vinylchloride and vinylacetate.

4. The screen of claim 2, wherein the block copolymer consists essentially of sequentially arranged blocks of polydimethylsiloxane and polyalkylmethacrylate, wherein the block copolymer is substantially free of homopolymerized polyalkylacrylate and homopolymerized polydimethylsiloxane.

5. The screen of claim 4, wherein the block copolymer consists essentially of sequentially arranged blocks of polydimethylsiloxane and polymethylmethacrylate.

6. The screen of claim 5, wherein the block copolymer consists essentially from about 5–90 percent by weight of the polydimethylsiloxane blocks and correspondingly from about 10–95 percent by weight of the polymethylmethacrylate blocks.

7. The screen of claim 6, wherein the protective layer consists essentially of a polymethylmethacrylate film having incorporated therein 0.01–5.0 percent by weight of the block copolymer.

8. The screen of claim 6, wherein the protective layer consists essentially of a cellulose acetate butyrate polymer having incorporated therein 0.5–5.0 percent by weight of the block copolymer.

* * * * *